United States Patent [19]

Groner et al.

[11] Patent Number: 4,716,583
[45] Date of Patent: * Dec. 29, 1987

[54] VERBAL COMPUTER TERMINAL SYSTEM

[75] Inventors: Gabriel F. Groner; Eric A. Dorsey, both of Palo Alto; Keith M. Williams, San Francisco; Harihar J. Vyas, San Jose, all of Calif.

[73] Assignee: Speech Plus, Inc., Mountain View, Calif.

[*] Notice: The portion of the term of this patent subsequent to Apr. 21, 2004 has been disclaimed.

[21] Appl. No.: 907,458

[22] Filed: Oct. 22, 1986

Related U.S. Application Data

[63] Continuation of Ser. No. 552,292, Nov. 16, 1983, Pat. No. 4,659,877.

[51] Int. Cl.$^4$ .................................. H04M 11/00
[52] U.S. Cl. ............................ 379/88; 379/94; 379/97
[58] Field of Search ............. 381/52; 379/88, 89, 379/93, 97, 102, 104, 105

[56] References Cited

U.S. PATENT DOCUMENTS

| | | | |
|---|---|---|---|
| 4,191,855 | 3/1980 | Sakai | 379/102 |
| 4,427,848 | 1/1984 | Tsakanikas | 379/97 X |
| 4,489,438 | 12/1984 | Hughes | 379/88 X |
| 4,554,418 | 11/1985 | Toy | 379/97 X |
| 4,577,062 | 3/1986 | Hilleary et al. | 379/88 |
| 4,653,100 | 3/1987 | Barnett et al. | 381/52 |
| 4,659,877 | 4/1987 | Dorsey et al. | 379/88 |

FOREIGN PATENT DOCUMENTS

| | | | |
|---|---|---|---|
| 59880 | 9/1982 | European Pat. Off. | 381/52 |
| 2040140 | 8/1980 | United Kingdom | |

OTHER PUBLICATIONS

Speech Plus, Inc., "Operating Manual: Model T/VI-S-X Telephone/Voice Interface System," "Preliminary User's Guide, May 30, 1983, ®1983, By Speech Plus, Inc., Mountain View, Calif.

Eric J. Lerner "Products That Talk," *IEEE Spectrum,* Jul. 1982, pp. 32-37.

Jonathan Allen, "Synthesis of Speech from Unrestricted Text," Proceedings of the IEEE, vol. 64, No. 4, Apr. 1976, pp. 433-442.

*Primary Examiner*—Keith E. George
*Attorney, Agent, or Firm*—Flehr, Hohbach, Test, Albritton & Herbert

[57] ABSTRACT

A telephonic data communications system provides verbal communication of data in remote computer systems. The major components of the systems are a plurality of channels and a data processor. Each channel includes a text-to-speech translator for translating digitally stored textual data into analogue speech signals corresponding to the verbal expression of the textual data; a telephone interface for establishing a telephonic connection with a user by detecting incoming calls and by initiating calls; and an RS232 port for accessing a data base in a remote host computer system. The data processor includes software for controlling the communications protocols used by each channel, whereby each channel emulates a computer terminal suitable for communication with the remote computer system connected to that channel, and software for extracting selected data from the data received from the remote computer system. This system enables one to telephonically receive data from a remote computer without the need for a computer terminal and without needing to reprogram the remote computer to communicate with the telephonic data communication system.

12 Claims, 4 Drawing Figures

MULTICHANNEL TTS SYSTEM

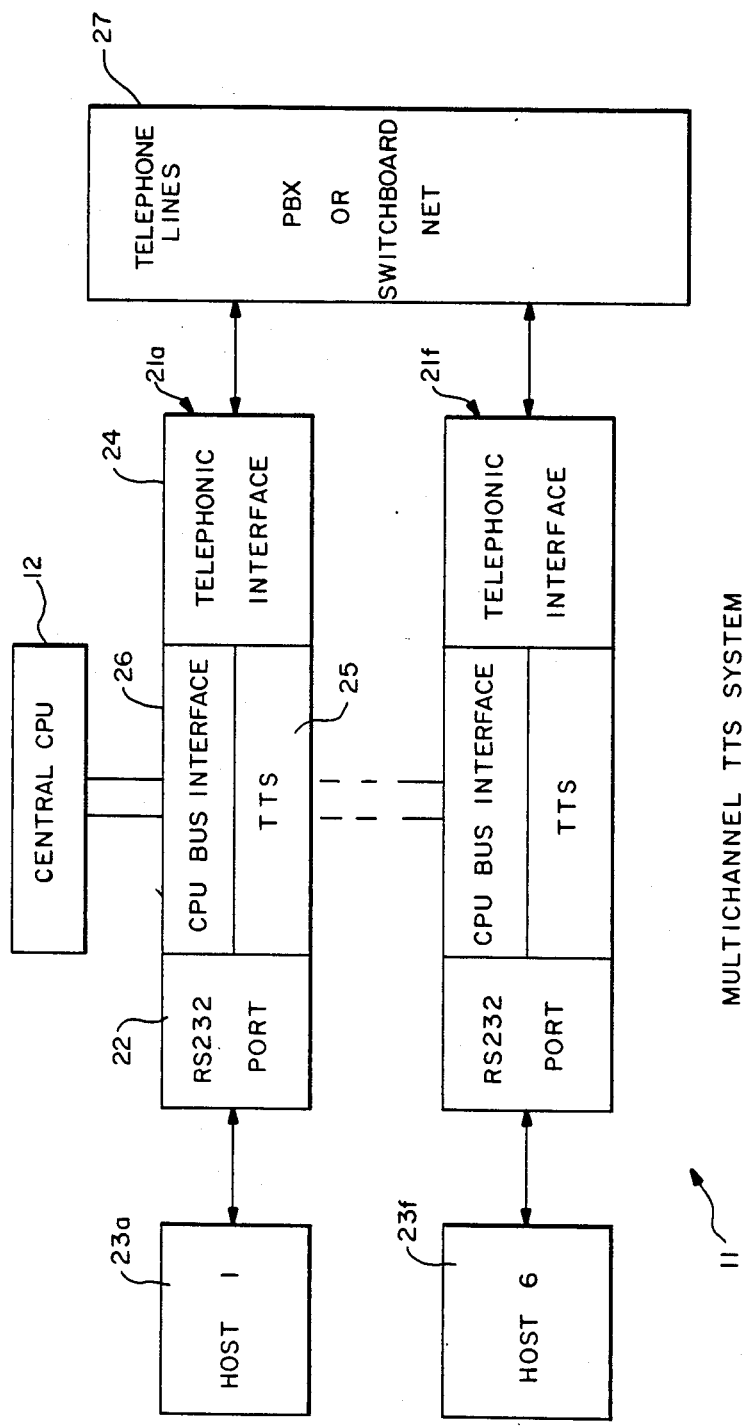
FIG.—1
MULTICHANNEL TTS SYSTEM

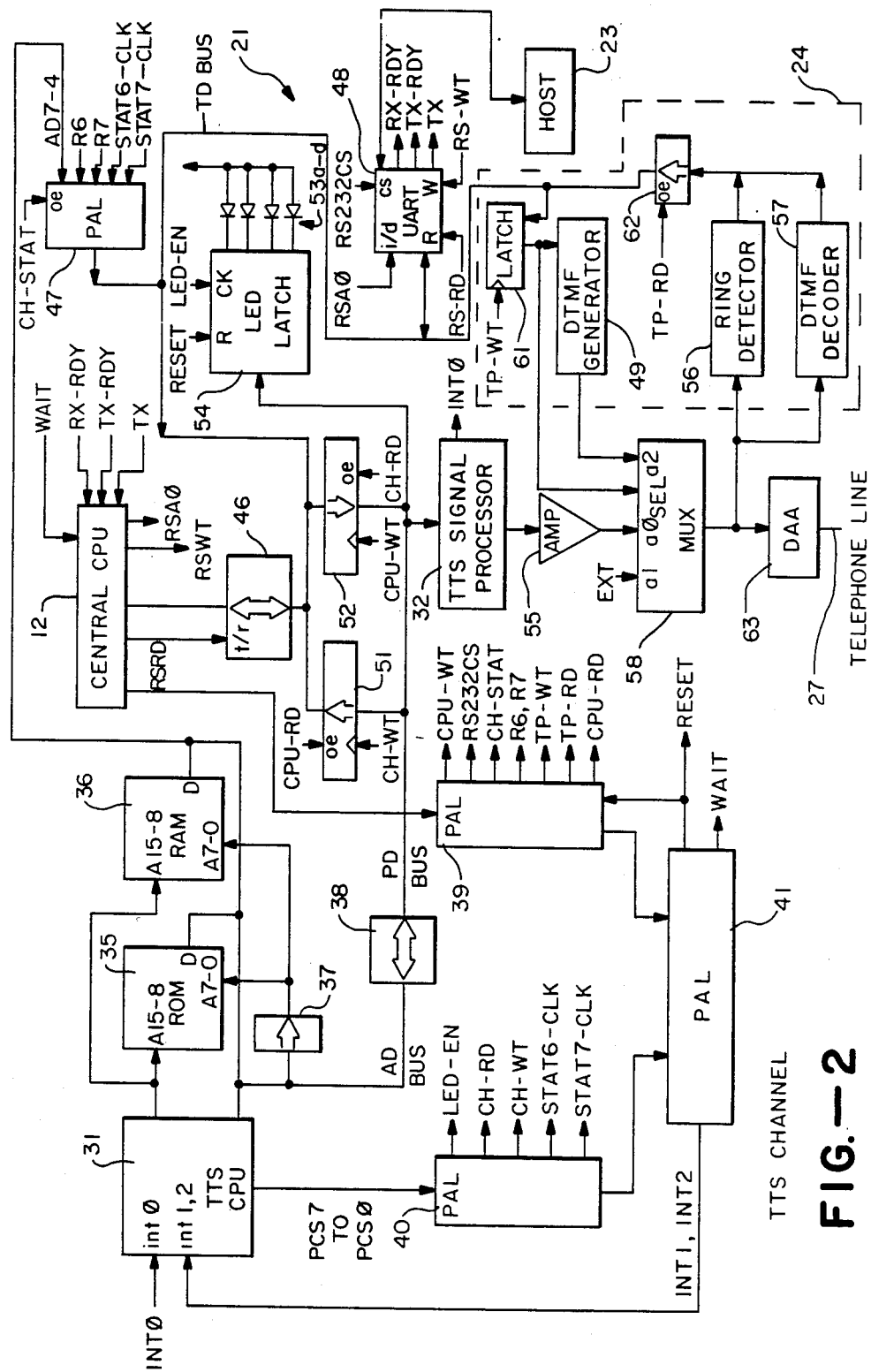
FIG.—2

VERBAL COMPUTER TERMINAL SYSTEM

This is a continuation of application Ser. No. 552,292 filed Nov. 16, 1983, now U.S. Pat. No. 4,659,877.

This invention relates generally to systems for transferring digitally stored data from a computer to a user, and more specifically to a system for verbally communicating textual data stored in a remotely located computer to a telephone caller.

BACKGROUND OF THE INVENTION

Generally, most computer data access systems require the user to have a computer terminal with a keyboard, or other equivalent device (e.g. card reader or tape reader in older systems), in order to initiate access to a data base in a computer. A few systems have been developed for telephonic communication with computers. These systems, however have generally had a limited verbal vocabulary and have been designed for use in a specfic application (i.e. with a specific computer, using a specific data base, for a predefined task). Only one system known to the inventors (developed by the inventors and the assignee) allowed use of an unlimited verbal vocabulary, but was still limited to use of a single application on a single host. As with other earlier systems, this latter system required programming the host computer to interact with the telephonic data access system.

It is therefore a primary object of this invention to provide a system for telephonic communication with a plurality of remote computers that are not specially configured for use with the telephonic communication system.

A further object of the invention is to provide a multi-channel communications system that accepts Touch Tone (a trademark of AT&T, hereinafter called DTMF, for dual tone multiple frequency) encoded commands from a telephone caller and that can translate encoded text (e.g. ASCII text) from a plurality of distinct data bases into verbal English (or any other language), regardless of the content of the data base.

Still other objects of the system are for each channel to emulate a computer terminal acceptable to the host it is accessing, to be able to program the system to extract selected data from the data retrieved from a data base and to translate and route to the user only the extracted data. Furthermore, the user should be able to create responses using DTMF encoded signals for transmission to selected destinations.

SUMMARY OF THE INVENTION

Accordingly, there is provided a system for the verbal telephonic communication of textual data in remote computer systems. The major components of the system are a text-to-speech (TTS) translator, a telephonic interface, a data base access interface and a central processor for controlling and coordinating the other parts. The TTS translator enables the system to translate virtually any textual material into English. The telephonic interface provides a telephone connection with a user by detecting incoming calls and by initiating calls, decodes DTMF instructions by the user and transmits verbal responses back to the user. The data base interface establishes a connection to a remote (host) computer system, emulating a computer terminal compatible with the host, and transmits data requests to and receives data from the host. Finally the central processor controls the data communication system by responding to signals from the telephonic interface indicating that a call has been received or that certain DTMF signals have been entered, initiating access to the host, extracting selected data from the data received from the host, and routing the extracted data to the TTS translator and then back to the user.

In a preferred embodiment the system has several channels all run by a small computer. Each channel has its own TTS translator, telephonic interface and data base interface, in addition to an interface to the central computer. Each channel can be used with a different application in a different host. Furthermore, each channel can be used to initiate telephone calls, not only to receive them.

BRIEF DESCRIPTION OF THE DRAWINGS

The invention and objects and features thereof will be more readily apparent from the following detailed description and appended claims when taken in conjunction with the drawings, in which FIG. 1 is a schematic diagram of a multi-channel data communications system in accordance with this invention.

FIG. 2 is a schematic diagram of one channel in the data communications system in FIG. 1.

DESCRIPTION OF THE PREFERRED EMBODIMENT

Figure 3A:
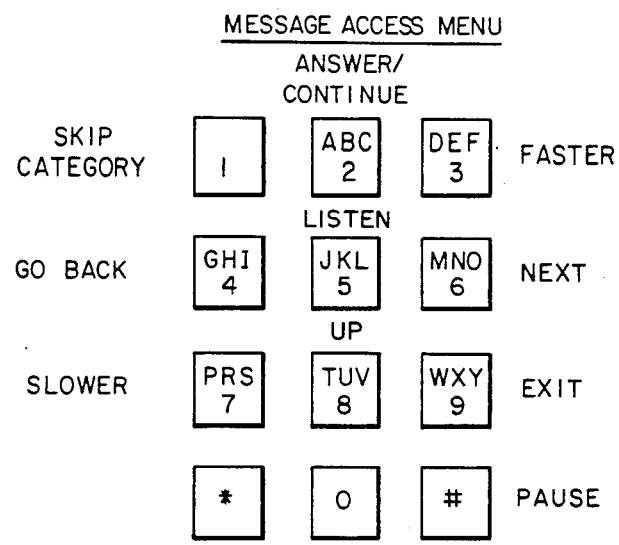
FIGS. 3a and 3b are two schematic views of a standard telephone keyboard, showing the assigned function of each key in an electronic mail system.

Referring to FIG. 1, the basic architecture of a preferred embodiment of the invention is a small central computer (CPU) 12 connected to a plurality of identical communications channels 21a-21f. The central CPU 12 can be an IBM PC, a compatible computer such as the Columbia Data Products MPC, or any other data processor having similar or stronger capabilities. Each channel 21 contains four major elements: an RS232 communications port 22 for communicating with a host computer 23, a telephonic interface 24 for connection to telephone lines 27, a text-to-speech (TTS) translator 25 and a CPU bus interface 26.

Each channel 21 can handle one data access task between a caller and a data base 23 at a time. The task may be initiated by either the caller or by the CPU 12. All the channels 21 can be connected to a single host computer 23 or to different hosts 23a-23f. Since each channel 21 emulates a standard computer terminal, the hosts 23 do not need to be specially programmed for use with the system 11. To emulate a terminal, the data received by each channel 21 is buffered and the desired data extracted by the CPU 12. Thus, carriage returns and screen control characters are removed, and routines are provided for extracting columns and other blocks of data from full screens (e.g. 25 lines of 80 characters each) of data. Standard computer terminal signals are sent by the channel 21 to the host 23.

Referring to FIG. 2, the schematic diagram for one channel 21 will be explained by following the flow of data through the channel 21. Data flows generally from the host 23, to the central CPU 12 to the TTS CPU 31, to the text-to-speech (TTS) signal processor 32, to the telephonic interface 24, and then to the caller via the telephone line 27. Other data flow paths include DTMF encoded commands from the caller to the central CPU 12 and calls initiated by the central CPU 12 to a caller.

Internal to the channel 21 there are three major data buses, labeled AD, PD and TD. The AD bus carries both addresses and data to and from the TTS CPU 31. The PD bus is the processor data bus, which carries data flowing between the central CPU 12 and the TTS CPU 31, and also data flowing from the TTS CPU 31 to the TTS signal processor 32. The TD bus is the telephony data bus, which carries data from both the telephonic interface 24 and the RS232 interface 22 to the central CPU 12. Each of these data buses also performs other data flow tasks which are described below.

The main tasks of the TTS CPU 31 are text-to-speech processing and the coordination of communications with the central CPU 12. The software for the TTS CPu 31 generally resides in a read only memory (ROM) 35. A random access memory (RAM) 36 provides scratch pad memory for performing text-to-speech algorithms. The AD bus carries both data (to and from the TTS CPU 31) and the lower address byte A7–A0 for the ROM 35 and RAM 36. It is directly connected to the the data outputs of the ROM 35 and RAM 36, and indirectly connected to the lower address input lines of the ROM 35 and RAM 36 by a clocked buffer 37. The PD bus is connected to the AD bus by a bidirectional buffer 38.

The TTS CPU 31 generates a variety of status signals PCS7-PCS0 which are combined with control signals from the central CPU 12 to generate a variety of internal control signals, the most important of which are described below. Several programmable array logic circuits (PALs) 39, 40, and 41 and 47 perform predefined logic functions to generate these internal control signals.

Three of these internal control signals comprise interrupt signals INT0, INT1, and INT2. The corresponding interrupt routines in the TTS CPU 31 are edge triggered, i.e. by the corresponding interrupt signal changing from an inactive to an active state. INT0 is generated by the TTS signal processor 32 every 10 milliseconds, indicating that it is done processing the last packet of speech data which was sent to it. In response to INT0 the TTS CPU 31 sends, via the PD bus, a new packet of speech data (which comprises 74 bytes of speech parameters in the preferred embodiment) to the TTS signal processor 32. If there is no new speech data to be processed, the TTS CPU 31 responds to the INT0 signal the first time by sending the TTS signal processor 32 a special silence packet and thereafter sends no new data to the TTS signal processor (thereby causing the TTS signal processor 32 to reuse the silence packet) until there is new speech data ready for processing.

The INT1 signal is set whenever the central CPU 12 sends a byte of information to the channel 21, latching the information into buffer 52 with a CPU-WT signal. The TTS CPU 31 responds by reading in information from the buffer 52 with a CH-RD signal, thereby resetting the INT1 signal.

The INT2 signal is set whenever the central CPU 12 reads a byte of information from buffer 51, using the CPU-RD signal. The TTS CPU 31 responds by determining if it has any more data to send to the central CPU 12 and resetting the INT2 signal, using a CH-WT signal.

Other important internal signals are the channel status signals. A four-bit indication of the status of the channel is formulated using PAL 47 and transmitted to the central CPU 12 via the TD bus. The transmission of these status signals to the TD bus is enabled by the CH-STAT signal, generated by PAL 39. These status signals can be set by using the STAT6-CLK and STAT7-CLK clock signals to clock in the corresponding AD bus signal (e.g. AD4 can be latched into the TD4 bit by either STAT6-CLK or STAT7-CLK). However, the clocked in values for the TD6 and TD7 bits can be overridden by the R6 and R7 signals, respectively, where R6 is active during either CPU-RD or RESET and R7 is active during either CPU-WT or RESET. Thus, a signal on TD6 is used to indicate that the TTS CPU 31 is ready to send a byte to the central CPU 12, and a signal on TD7 is used to indicate that the TTS CPU 31 is ready to read a byte from the central CPU 12.

RESET is used to reset and re-initialize the channel. The RESET signal is generally generated upon power up or upon activating a manual reset or power switch (not shown). Furthermore, a WAIT signal is generated by PAL 41 whenever the central CPU tries to read this four-bit status value (via the CH-STAT signal) at the same time that either the STAT6-CLK or STAT7-CLK clocks are being used to update the channel status values, thereby causing the central CPU 12 to wait unitl the status values are valid before reading them in.

The CH-RD and CH-WT signals are generated by PAL 40 in response to status signals PCS7-PCS0 generated by the TTS CPU 31 and are used by the TTS CPU 31 to transfer data between the TD and PD data busses. The CPU-RD and CPU-WT signals are generated by PAL 39 (which basically decodes a few signals from the central CPU 12 to determine what action, if any, the central CPU 12 is requesting) and are used by the central CPU 12 to transfer data between the TD and PD data busses.

The central CPU 12 is connected to the TD bus by a bidirectional buffer 46. The direction of data flow through this buffer 46 (which determines whether the central CPU 12 is transmitting or receiving data from the channel 21) is determined by signal RSRD from the central CPU 12.

The following components are connected to the TD bus. As already described above, PAL 47 is used to generate channel status signals, representative of the status of the channel 21, which are transferred to the TD bus by the CH-STAT signal.

The RS232 port comprises a standard UART (universal asynchronous receiver transmitter) component 48. The UART 48 transmits the data from the TD bus to a remote computer 23 in response to a RS-WT signal, and it transmits data from a remote computer to the TD bus in response to a RS-RD signal. Signal RSA0 from the central CPU 12 is used to determine if the data on the TD bus is data to be transmitted to the remote computer system 23 or is to be read into the program register of the UART 48 which is used to determine the communications protocol used by the UART 48. The The UART 48 also generates TX-RDY, TX and RX-RDY signals, which are sent directly to the central CPU 12 for processing thereby. The RX-RDY signal indicates when the UART 48 has received a byte of data from the host 23. The TX-RDY signal indicates that the UART 48 has transmitted to the host 23 the last byte of data sent to it. The TX signal indicates that the UART 48 transmitter is empty. The RS232CS signal generated by PAL 39 enables operation of UART 48.

The telephonic interface 24 is connected to the TD bus in two places. First, it sends signals to the TD bus via buffer 62 whenever a telephone call is detected, including a telephone RING signal, and decoded signals corresponding to any DTMF (dual tone multi-frequency) signals sent by the caller. Second, the TD bus can be used to send binary encoded signals to a DTMF generator 49 for initiating telephone calls to selected telephone numbers.

The PD bus is used primarily for communication with the TD bus and for sending pre-processed speech data from the TTS CPU 31 to the TTS signal processor 32. The PD bus is connected to the TD bus by two unidirectional buffers 51 and 52. Data transfers from the PD bus to the TD bus are handled by using a CH-WT signal to clock data from the PD bus into buffer 51, and using a CPU-RD signal to enable transmission of the latched data (from buffer 51) onto the TD bus. Data transfers from the TD bus to the PD bus are handled by using the CPU-WT signal to clock data from the TD bus into buffer 52, and using a CH-RD signal to enable transmission of the latched data (from buffer 52) onto the PD bus. The PD bus is also used to control a few LEDs (light emitting diodes) 53a-53d which are used to visually indicate the status of the system 11. The data value on the PD bus is latched into LED latch 54 in response to an LED-EN signal.

The text-to-speech processing performed by the channel 21 is done in two stages. First the textual data is analyzed and broken into basic speech elements by the TTS CPU 31. The TTS CPU 31 then generates and sends to the TTS signal processor 32 a set of amplitude, frequency and bandwidth parameters that define a time varying digital filter network. These parameters are then translated into analogue speech signals by the TTS signal processor 32. Generally these analogue speech signals are too weak for direct transmission to a speaker or to a telephone line and must first be amplified, as by amplifier 55. For a more detailed description of text-to-speech translation, see G. Groner, J. Bernstein, E. Ingber, J. Pearlman & T. Toal, "A Real-Time Text-to-Speech Converter," Speech Technology, vol. 1, no. 2, p. 73–76 (April 1982).

The telephonic interface 24 handles both incoming and outgoing signals. Incoming signals in this system are generally limited to ring signals (i.e. signals indicating the presence of an incoming telephone call) and DTMF signals (i.e. touch tone signals sent by the caller to send commands to the system 11). Standard ring detector 56 and DTMF decoder 57 circuits generate RING and DTMF signals which are transmitted to the central CPU 12 by way of buffer 62 and the TD bus. Signal TP-RD, from PAL 36, enables buffer 62 to transmit these signals for reading by the central CPU 12. Outgoing telephone signals can be either TTS speech signals, DTMF signals or some other externally generated signal. A multiplexer 58 is used to select which of these three signals is transmitted to the telephone line 27. As described above, the outgoing TTS speech signal is generated by the TTS signal processor 32 and its amplifier 55.

The DTMF signals are generated by DTMF generator 49 to initiate telephone calls. The digits of the telephone number to be called are sequentially latched in from the TD bus by latch 61 (using clock signal TP-WT from PAL 39), encoded by DTMF generator 49 into standard Touch Tone (i.e. DTMF) signals, and then routed through multiplexer 58 and DAA circuit 63 (a standard telephone interface circuit known either as a DAA or as FCC part 68) to the telephone line 27. Finally, any externally generated signal, such as an initial prerecorded message (e.g. explaining which DTMF signals to use to request data) or background music for use while the system 11 is working on the caller's data request, can be transmitted to the caller.

Next described are three sets of software from a preferred embodiment used in the central CPU 12 to operate a multi-channel telephonic data communication system 11. The three sets comprise: (1) a set of system level support programs; (2) a run-time utility library, including text manipulation routines, serial communications support routines, text-to-speech management routines, and telephony support functions; and (3) an electronic mail system.

Basic system level support programs for a telephonic data communication system 11 in accordance with the present invention include a multitasking operating system; a CONFIGURE program, to define the hardware and software operating environment of the system 11; a START-UP program to initialize the system at run time; a SHUT-DOWN program to terminate the activities on one channel or the entire system; a LOG program to monitor the activity of all channels and to maintain a history of system activity; and a DIAGNOSTICS program to check the operations of each function of each channel and other device in the system.

The multitasking operating system is configured to simultaneously run a monitor plus one application for each channel. Each channel is treated as a separate user that gets the use of the central CPU's resources only as needed. The monitor, among other tasks, runs the LOG program described below.

CONFIGURE provides a series of menu selections to specify: the current data and time; the number of active channels; the hardware address and logical channel ID of each channel; XON/XOFF or hardware handshake protocol; the mode of terminal emulation for each channel (e.g. VT100, or ANSI); the start-up diagnostic and initial conditions for each channel; the application program associated with each channel (the system is capable of running a different application on each channel); the serial I/O configuration (e.g. one port per channel, or all channels multiplexed through the central CPU's RS232 port); the reporting method of the LOG program (e.g. continuous updating or report production only upon command). Note that in some applications the central CPU 12 will have its own RS232 port for communication with remote computers. In such applications, the central CPU's RS232 port can be used for all communications with the remote computer if only one remote computer is being accessed and it is feasible to multiplex the signals from to all the channels through one port.

START-UP performs system initialization at runtime and invokes the various application programs. It also invokes the LOG program. Diagnostic failures or other abnormal conditions on a particular channel cause all processes associated with that channel to be terminated. The results of the start-up process are reported to the LOG program.

SHUT-DOWN controls the termination of activities on one channel or the entire system. The commands available are: SUSPEND the activity on channel N or ALL channels when the application completes the current task; RESTART suspended channel N or ALL; and ABORT all activity immediately.

LOG monitors the activity of all channels and maintains a history of system activity. The information is updated on a continuous basis, and can be displayed on the system console all the time, or just when requested. Current status information associated with each channel is: line is ON/OFF HOOK; channel is or is not speaking; channel RS232 communications are or are not active; name of the application active on the channel. A history of channel activities since the last system reset is maintained and includes: a histogram of the total number of calls per hour (using bins for 1–10, 11–20, 21–40, 41–60, 61–80, and greater than 80); the total number of call per channel; a histogram of call lengths in minutes (using bins for 0–1, 1–2, 2–3, 3–4, 4–6, 6–8, 8–12, 12–16, and greater than 16); the amount of time N channels are active concurrently (N=2, 3, 4, 5, 6); the total number of RS232 characters received and transmitted on each channel; and the amount of time since the last system reset.

The run-time utility library addresses many of the problems and tasks that will be needed for most applications of the telephonic data communication system 11. The utility programs and functions described herein are only exemplary in nature and are intended only to show the basic features of a complete system. Furthermore, it should be understood that these utilities are the basic tools one would use to build a particular predefined application; they do not, in and of themselves, constitute a complete application of the system. In other words, a computer programmer could use these utilities as subroutines and functions to handle most of the hardware dependent aspects of handling the particular set of tasks which define the application he is building.

One set of these utility programs are called the text manipulation utilities. The text manipulation functions enable one to extract the test intended to be spoken from the surrounding text, and to format the text appropriately for the text-to-speech conversion process. A first class of the text manipulation utilities operate on data in a buffer, in line editor fashion, moving selected pieces of text to another buffer for output. A second class of text manipulation utilities emulate a particular computer terminal and format the data according to a fixed screen format.

The line editor type of text manipulation functions start by defining text manipulation strings or buffers. FBUF contains the text to be edited (i.e. from which text it is to be extracted) and TBUF receives the edited text. The portion of the text to be moved is specified by manipulating four variables: FSTART, the pointer to the current FBUF; TSTART, the pointer to the current TBUF; TPTR, the pointer to the current character in FBUF; and TPTR, the pointer to the next available slot in TBUF. Text is accessed from the FBUF at the character pointed to by FPTR, and is placed in TBUF at the character pointed to by TPTR. TPTR is advanced as characters are added to TBUF. These pointers are manipulated by the utilities next described. These text editing utilities are implemented as function calls. Thus arguments are passed in the calling sequence defining the operations to be performed, and a value (or pointer) may be returned by the function, if needed.

INIT (ALPHA, BETA) assigns ALPHA as the current FBUF, and BETA as the current TBUF. It also sets FSTART and FPTR to the beginning of FBUF (i.e. ALPHA), and it sets TSTART and TPTR to the beginning of TBUF (i.e. BETA). FBUF is terminated with a null character to mark its end.

FILL (N) copies the next N characters from FBUF, starting at FPTR, to TBUF at TPTR. If FPTR reaches the null at the end of FBUF, then a null is written after the last character in TBUF, and FPTR and TPTR are left pointing to their respective null characters.

FILL-AND-SWAP copies the remaining portion of FBUF (i.e from FPTR through the null character) to TBUF and then swaps FSTART and TSTART and resets FPTR to FSTART and TPTR to TSTART. This is used when a second pass is required to edit the received data.

FILL-TO-FIND (STR, N) copies FBUF to TBUF up to but not including the first character of the Nth occurrence of STR (N must be greater than 0). A pointer is returned to the first character in FBUF following the Nth occurrence of STR. If the search is not successful, all of FBUF is copied, including the null, and a null pointer is returned.

FIND (STR, N) search FBUF from FPTR forward (for N greater than 0) or backward (for N less than 0) for the Nth occurrence of STR. No characters are copied to TBUF. FPTR is set to the first character of the Nth occurrence of STR, and a pointer is returned set to the first character in FBUF following the found STR. If the search fails, FPTR is set to FSTART if N was less than 0, or to the null at the end of FBUF is N was greater than 0, and a null pointer is returned.

INSERT (STR) places the contents of STR into TBUF starting at TPTR and advances TPTR to the first character following the copy of STR in TBUF.

LOWERCASE (N) writes N characters from FBUF, starting at FPTR, as lowercase characters to TBUF. N may be greater than the remainder of FBUF, or if N equals 0 then the remainder of FBUF will be copied. In the latter two cases, FPTR is left pointing to the null at the end of FBUF.

REPLACE (STR1, STR2, N) replaces each of the first N occurrences of STR1 with STR2 while copying FBUF to TBUF. FPTR is left pointing to the first character following the Nth occurrence of STR1. If the search exhausts FBUF then FPTR and TRTR will be left pointing to the nulls at the end of the buffers.

REPLACE-BY-TABLE (TARRY, N) copies FBUF to TBUF using a table TARRAY of "search) strings and corresponding "replace" strings to define which strings should be replaced, and with what they should be replaced, during the copy operation. FPTR and TPTR are left pointing to the respective nulls at the ends of the buffers. Note that this function can be used to translate 2-key DTMF sequences into alpha characters. TARRAY must be ordered by ascending ASCII value of the search strings.

MAKESTRING writes a null at TPTR and then sets TPTR to TSTART. The function returns the number of characters in TBUF.

SWAPBUFFERS writes a null at TPTR, swaps FSTART and TSTART to exchange FBUF and TBUF, and then starts FPTR to FSTART and sets TPTR to TSTART.

UNFIND (UFCHAR) scans FBUF from FPTR to the first character which is not UFCHAR. No characters are written to TBUF. This is used to skip over repeated characters, e.g. to find the first non-blank character.

The screen format text manipulation utilities are next descrbied. These utilities operate on FBUF assuming it is in the from of a screen image, containing 25 lines of 80 characters each. The lines are blank-filled where necessary.

MAKESCREEN (CODE) copies from the beginning of FBUF to TBUF at TPTR, expanding control codes and blank-filling where appropriate to create a screen image in TBUF. CODE points to an array containing control codes and their expansion according to the type of terminal emulation that is being performed.

GET-SCREEN-BLOCK (ROWN, COLN, ROWM, COLM) copies a rectangular area of a screen image in FBUF specified by the row-column coordinates to TBUF. N refers to the upper left corner, and M refers to the lower right corner of the rectangular are to be copied. This function returns a null if either N or M is out of range, or if FBUF is not a screen image, and otherwise the function returns a 1.

NON-EMPTY-LINE (LINEN, LINEM) returns the number of non-empty lines between two specified lines in a screen image in FBUF. No characters are copied to TBUF. This function returns a null if either of the specified line numbers is out of range, or if FBUF is not a screen image.

The following serial communications functions manage the transmission and reception of strings to and from the host computer 23.

SEND-SER (STR, CH) transfers the string pointed to by STR to the appropriate I/O driver for transmission to the host computer on channel CH. The function returns immediately; it does not wait for transmission to take place.

GET-SER (STR, CH) places in STR all characters sent from the host connected to channel CH since the last time GET-SET was executed for channel CH. This function returns the numbers of characters received, if any.

WAIT-SER (STR, TERM, CH) places in STR all characters received from the host connected to channel CH until the terminator TERM is received. TERM can be a string, not just a single character. If timeout occurs before TERM is received, STR is set to a null. The function returns the number of characters actually appended to STR.

SET-SER-TIMEOUT (TIME, CH) set the timeout period for channel CH to TIME seconds. The value selected stays in effect until changed.

The following functions manage text-to-speech operations.

SPEAK (STR, CH) sends the string pointed to by STR to the text-to-speech translator in channel CH.

GET-TTS (STR, CH) places the STR all response characters received from the text-to-speech translator on channel CH since the last such request. This function returns the number of characters, if any. One type of response character is an error code indicating a hardware failure or the receipt of an inappropriate command from the central CPU 12. Other response characters are generated by inserting special index markers into the text to be translated. The index markers are not translated. Rather, they are echoed back to the central CPU 12 after the text immediately preceding the marker has been translated. Up to 256 unique markers can be used in the preferred embodiment. These markers are generally used for synchronizing a process, such as responding to a DTMF signal with verbal communications.

WAIT-TTS (STR, CH) returns when the text-to-speech converter on channel CH responds with the characters pointed to by STR. STR is set to null if a timeout occurs.

SET-TTS-TIMEOUT (TIME, CH) sets the TTS timeout period for channel CH to TIME seconds. This value stays in effect for all TTS (text-to-speech) operations on channel CH until changed.

The following telephony support functions perform line control, DTMF code processing, and dialing functions.

WAIT-RING (CH) returns after a ring has been detected on channel CH.

OFF-HOOK (CH) seizes the telephone line on channel CH.

ON-HOOK (CH) drops the telephone line on channel CH.

TAP-HOOK (CH) causes the telephone line on channel CH to go on-hook for 500 milliseconds (msec), and then go off-hook again. This can used in a PBX environment by programming the PBX to respond to this TAP-HOOK signal by either causing the call to be picked up or signaling an operator.

GET-DTMF (STR, CH) places in STR all DTMF codes received on channels CH since the last such request. The function returns the number of DTMF codes appended to STR.

WAIT-DTMF (STR, LEN, CH) places in STR a string of digits of length LEN from channel CH. If LEN equals 254 or 255, an arbitrary string (with a maximum length of 255 digits) is read until the * or # key is input as a terminator. If timeout occurs before LEN codes are received, nothing is placed in STR. The function returns the number of codes received or null if timeout occurs. Use REPLACE or REPLACE-BY-TABLE to convert the DTMF codes with alpha characters.

SET-TEL-TIMEOUT (TIME, CH) sets the telephonic timeout for channel CH to TIME seconds. The default value is 10 seconds. The value selected stays in effect for all telephonic operations until it is reset.

DIAL (STR, CH) seizes the telephone line on channel CH, waits for the dial tone, and then dials the number pointed to by STR. The string can contain the ASCII characters 0-9, *, #, A, B, C, D, w, and d. When w is encountered, a pause of three seconds is inserted before the next digit is dialed. Additional delay can be created with multiple w characters. If d is encountered, the system waits for a secondary dial tone before proceeding with subsequent digits in the string. Note that the characters A, B, C and D generate DTMF codes not normally used in civilian telephonce systems.

The following is a description of a multichannel telephonic electronic mail system using the telephonic data communication system of the present invention. The call dials a special telephone number which goes to one of the channels of the telephonic mail system. The caller is greeted with a fixed initial message, such "Hello, this is the XXX Company Mail system, please enter your Username." After the caller enters a legal Username, the system generates a message such as "Please enter your password." While the caller enter this information, a connection is made with the electronic mail system through either a common carrier (e.g. Tymnet, or Telenet) or directly to the host system with the electronic mail data base. The call is informed of progress with spoken messages such as "I'm now calling TELENET" and "I'm now logging on to TELEMAIL".

Note that the method of handling Usernames and Passwords is dependent on the nature of the electronic mail system being used and of the method of access to the host system. In the most general case, the user will translate his Username and Password to a string of numerics using a multiple keypush algorithm to enter alpha characters. One such scheme is to push the key containing the letter followed by a 1, 2, or 3 to identify which of the three letters on the key is to be used. The 0 key is used for Q and the 1 key is used for Z. When numbers are entered, they are followed by a # to differentiate them from alpha character entries. The DTMF key string in entered when the Username and Password are requested, and are converted by the application program in the central CPU into the correct alphanumeric strings.

To avoid entering alpha information through the TouchTone keypad, the following system can be used. Each user who expects to access messages from a telephone can establish a numeric Username and Password, which are independent of his system Username and Password, for use with the telephonic mail system. To establish the telephonic Username and Password the user enters a command, such as @PW UUUU: Username, PP:Password. "@PW" is a command to the host computer to validate and send the telephonic username and password information to the telephonic mail system through a port to its central CPU.

"UUUU" is a four digit string to be used as the telephonic username. "UUUU" will be checked for uniqueness with respect to other users. "Username" is the designator by which the user is known to the host electronic mail system. "PP" is a two digit string to be used as the telephonic password. "Password" is the user's normal electronic mail password.

To help secure the confidentiality of the user's password, PP can be exclusive-ORed with the Password pairwise over all the characters in Password to scramble it while it is stored in the telephonic mail system. A file is maintained on a disk in the telephonic mail system which contains for each user: UUUU, Username, and the scrambled password. When the caller accesses the telephonic mail system he enters UUUUPP when requested. UUUU then become an index to the username file, and PP is again pairwise exclusive-ORed with the scrambled password, thereby returning the password to its original form to be used in the log-on sequence. Other commands are used for deleting and replacing telephonic usernames and passwords.

When the password has been entered, a log-on sequence is generated and, if valid, the user's mailbox is accessed. The caller hears a message announcing the number of unread mail messages waiting. The messages are grouped by sender. Thus the sign-on message might be, "You have 3 messages from Sam, and 2 from Peggy". Messages are accessed sequentially from each group (i.e. of messages from each sender) on a last-in-first-out (LIFO) basis. Unread messages are processed first. A "directory" pointer, which always points to the beginning of the header of a message, can be moved forward and backward though the directory to specify the message to be read. After the sign-on message, the directory pointer points to the first unread message, or to the most recent message in the directory if there are no unread messages.

Access by the telephone caller to the various features of the system is via mnemonically related codes on the telephone keypad. See FIG. 3a. The codes are arranged into two menus—one to access messages, and one to send an answer to the originator of a message. The message access menu contains nine command codes, all of which are active during speaking so that messages can be terminated for immediate access to another message or system function. At the completion of each task, a short tone is generated, indicating to the caller that the system is at the message access menu and is waiting for a command.

In this embodiment of a telephonic electronic mail system, a message consists of a header followed by the message content. The header is of the following form: FROM (originator's username); AT (HH:MM AM/PM today/yesterday), or ON (DAY for the previous six days), or ON (DATE otherwise); LENGTH (in minutes).

The message access commands are as follows. N(ext) - causes the message at the directory pointer to be spoken. If Next is pushed during message output, speaking is terminated at the next punctuation mark of the current message, the directory pointer is moved to the next message in the directory, and the system starts speaking that message from the beginning of its header.

G(o back) - terminates speaking at the next punctuation mark, moves the directory pointer to the previous message (earlier in time), and starts speaking that message from the beginning of its header.

I (Skip category) - is similar to Next, except the directory pointer will be moved to the beginning of the next category of messages. This command operates on groups of unread messages (i.e. all those from the same sender), and on categories of messages if the particular electronic mail system supports multiple directories for a single user.

L(isten) - restarts the current message from the beginning of the message content, but does not repeat the header.

U(p) - terminates speaking at the next punctuation mark, and resumes speaking at the beginning of the sentence preceding the current one.

F(aster) - increases the speaking rate by 25 words per minute at the next punctuation mark. The speaking rates available are 90, 115, 165, 190, and 205 words per minute. The system is initialized to 140 words per minute.

S(lower) - decreases the speaking rate by 25 words per minute at the next punctuation mark.

(pause) - stops current activity, giving the caller time to write down information or to collect his thoughts. The current activity is restarted with the C(ontinue) key.

(e)X(it) - terminates current activity and prepares the system to log-off. The message "If you don't want to log-off, push any button," is spoken to the caller to alert him that a log-off sequence is pending. If the caller pushes a button, the system returns to the message access menu, with the directory pointer at the message last read. Otherwise, after five seconds, a log-off message is sent to the host.

Figure 3B:
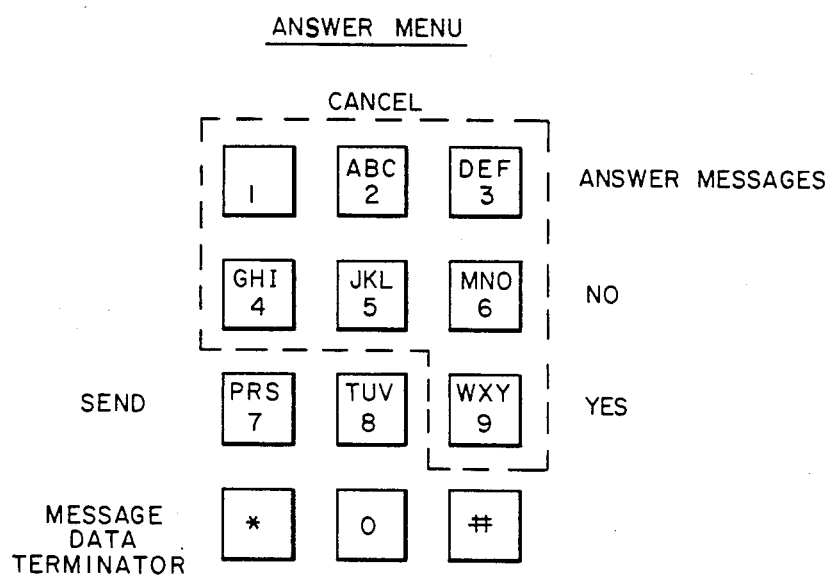

A(nswer) - terminates speaking at the next punctuation mark, if speaking, and enables commands on the answer menu. An Answer is one of eight predefined messages, described below, which results in a text message being placed in the mailbox of the originator of the message just listened to. The answer menu uses the same buttons as the message access menu, but with different mnemonic cues. See FIG. 3b. Since the menus are mutually exclusive, no duplication of function occurs.

The Answer message functions are:

1 - "Call me at -"; the caller enters a digit string (i.e. a sequence of TouchTone keys) terminated with an * which represents a telephone number.

2 - "Meet me at -"; the caller enters a digit string terminated with an * which represents the meeting time (HHMM) in 24 hour time format.

3 - "I will call you at -"; the caller enters a digit string terminated with an * which represents the meeting time (HHMM) in 24 hour time format.

4 - The caller enters a digit string which represents dollars and cents where the last two digits entered are the cents.

5 - The caller enters a digit string terminated with an * which represents a quantity.

Y - "My answer is yes."

N - "My answer is no."

S(end) - "I received your message about -": SUBJECT, where SUBJECT is text, which identifies the subject of the message, that is copied from the message. This is the default exit from the Answer menu if no other answer is to be returned to the originator, or if a previous Answer has been Canceled.

After any of these messages is entered, it is verbally repeated to the caller for verification. The caller then presses either C(ancel) to reject the message and return control to the Answer menu, or S(end) to transfer the message to the originator's mailbox and return control to the Message access menu. Successive selections of Answer with no intervening selection of Listen, Next, Last or l (skip group) will send successive messages to the same originator, referencing the same original message.

While there is no specific HELP request provided in this preferred embodiment, when the system is expecting a command input it will wait five seconds and then speak a prompt message explaining the options available at that point in the sequence. The prompt message will be terminated if any valid button is pushed. The prompt will be repeated a second time if no response if received within another five seconds. If there is still no input after yet another five seconds, the caller will be logged off, under the assumption that he is no longer there.

As an additional cue to the caller, a short tone will be sounded each time the system returns to the Message access menu. Two short tones, of another frequency, will be sounded if the callers enters an invalid command.

The key features of the invention include, but are not limited to: (1) emulating a computer terminal and handling all data extraction external to the host (remote) computer, thereby eliminating the need to program the host computer to interact with the telephonic data communications system; (2) having a multi-channel architecture wherein each channel can access a different data base in a different remote host computer; (3) using one central CPU in a multi-channel system to handle certain data extraction and system overhead functions; (4) using a set of standard utilities in a multi-channel text-to-speech data communication system to eliminate the need for most users to write hardware-dependent software; and (5) having an electronic mail system using a multi-channel text-to-speech data communication system, using standard DTMF signals to allow the user to select the mail items to be read and to make certain limited reply messages.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

What is claimed is:

1. A communications system for verbal telephonic communication of textual data in remote computer systems, comprising:
   (a) text-to-speech (TTS) means for translating digitally stored textual data into analogue speech signals corresponding to the verbal expression of said textual data;
   (b) telephone call handling means for initiating telephone calls and receiving data requests from the telephone answerer, including
      means for initiating a telephone call and establishing a telephonic connection with the answerer; and
      instruction means for receiving and interpreting instructions from said answerer, said instructions including commands specifying what data to retrieve;
   (c) data base access means for accessing a data base in a separate computer system, including
      means for establishing a connection with a separate computer system;
      means for emulating a computer terminal suitable for communication with said separate computer system; and
      means for requesting and receiving data from a data base in said separate computer system; and
   (d) data delivery means, including
      means, responsive to said instructions from said answerer, for extracting a portion of said data, wherein said portion of said data is selected in accordance with said instructions received from said answerer; and
      means for routing said portion of said data to said TTS means for translation thereby; and
      means for routing said speech signals from said TTS means to said answerer by means of said telephonic connection.

2. A communications system as set forth in claim 1, wherein
   said telephone call handling means further includes means for detecting an incoming telephone call and establishing a telephone connection with the caller; and
   said instruction means receives and interprets instructions from said caller; and
   said data delivery means is responsive to instructions from said caller and routes said speech signals to said caller.

3. A communications system as set forth in claim 2, wherein
   said means for extracting includes means for interpreting said data received from said remote computer system as a screen image and means for extracting a predefined portion of said screen image.

4. A communications system as set forth in claim 1, wherein
   said instruction means includes
      means for interrupting the verbal transmission of data to said answerer and means for respecifying the data to be retrieved; and
      rate changing means for specifying that the rate of verbal transmission be increased or decreased; and
   said data delivery means includes means responsive to said rate changing means for controlling the rate of verbal transmission to said answerer.

5. A communications system as set forth in claim 1, wherein said means for extracting includes means for interpreting said data received from said remote computer system as a screen image and means for extracting a predefined portion of said screen image.

6. A communication system for verbal telephonic communication of textual data in remote computer systems, comprising:
   (a) a plurality of channel means, each channel means including:
      (1) text-to-speech (TTS) means for translating digitally stored textual data into analogue speech signals corresponding to the verbal expression of said textual data;
      (2) telephone call handling means, including
         means for initiating a telephone call and establishing a telephonic connection with the answerer; and
         instruction means for receiving instructions from said answerer specifying what data to retrieve;
      (3) data base access means for accessing a data base in a separate computer system, including
         means for establishing a connection with a separate computer system;
   (b) data processing means coupled to said plurality of channel means, including a single central processor unit having a set of routines for
      (1) controlling the communications protocols used by the data base access means in each said channel, whereby each said data base access means emulates a computer terminal suitable for communication with said separate computer system connected thereto; and
      (2) in accordance with said instructions from said answerers to each said channel means, extracting a portion of the data received from said separate computer system connected to each said channel means and routing said extracted data to the TTS means of the channel means which received said data, wherein said portion of said data is selected in accordance with said instructions received from said answerer to said channel means.

7. A communications system as set forth in claim 6, wherein
   said telephone call handling means in at least one of said channel means further includes means for detecting an incoming telephone call and establishing a telephone connection with the caller; and
   said data processing means includes means responsive to instructions from said caller to at least one of said channel means for extracting a portion of the data received from said separate computer system connected to each said channel means and routing said extracted data to the TTS means of the channel means which received said data, wherein said portion of said data is selected in accordance with said instructions received from said caller to said channel means.

8. A communication system as set forth in claim 7, wherein
   said data extraction means includes means for interpreting data received from at least one of said remote computer systems as a screen image and means for extracting a predefined portion of said screen image.

9. A communications system as set forth in claim 8, wherein
   each said channel means can be connected to a distinct remote computer system, and each said data processing means can perform a distinct data extraction task corresponding to the particular data base being accessed.

10. A communication system as set forth in claim 6, wherein
    said data processing means includes a multitasking operating system having a separate task defined for each said channel means.

11. A communications system as set forth in claim 6, wherein
    each said channel means can be connected to a distinct remote computer system, and each said data processing means can perform a distinct data extraction task corresponding to the particular data base being accessed.

12. A communications system as set forth in claim 6, wherein
    said data extraction means includes means for interpreting data received from at least one of said remote computer systems as a screen image and means for extracting a predefined portion of said screen image.

* * * * *